(12) United States Patent
Thomas et al.

(10) Patent No.: US 11,455,536 B1
(45) Date of Patent: Sep. 27, 2022

(54) USING MACHINE LEARNING AND HISTORICAL EVENT DATA TO LEVERAGE PREDICTED ODDS FOR FUTURE EVENTS

(71) Applicant: JTAS, LLC, Lafayette, CA (US)

(72) Inventors: James Thomas, Oakland, CA (US); Andrew Solomon, Lafayette, CA (US)

( * ) Notice: Subject to any disclaimer, the term of this patent is extended or adjusted under 35 U.S.C. 154(b) by 0 days.

(21) Appl. No.: 17/589,887

(22) Filed: Jan. 31, 2022

Related U.S. Application Data (60) Provisional application No. 63/272,137, filed on Oct. 26, 2021.

(51) Int. Cl.
*G06N 3/08* (2006.01)
(52) U.S. Cl.
CPC ...................................... *G06N 3/08* (2013.01)
(58) Field of Classification Search
CPC ............. G06N 3/08; G06N 5/00; G06N 7/005
See application file for complete search history.

(56) References Cited

U.S. PATENT DOCUMENTS

| 10,799,154 B2* | 10/2020 | Sarkar | A45B 3/00 |
| 2018/0160943 A1* | 6/2018 | Fyfe | A61B 5/1112 |
| 2019/0130425 A1* | 5/2019 | Lei | G06N 20/00 |
| 2020/0118145 A1* | 4/2020 | Jain | G06Q 30/01 |
| 2020/0294365 A1* | 9/2020 | Moskowitz | G07F 17/3223 |
| 2021/0321942 A1* | 10/2021 | Pushpala | A61B 5/28 |

* cited by examiner

*Primary Examiner* — Ying Yu Chen (57) ABSTRACT

Described is a system (and method) for training and using machine learning models to identify potential discrepancies between predicted odds and actual odds for a future event. The system may create a predicted odds machine learning model using an ensemble training algorithm. To create the risk management machine learning model, the system may determine a set of past odds differences between predicted odds outputted by the predicted odds machine learning model for past events and the actual historical odds for those past events. Once the predicted odds machine learning model and risk management machine learning model are trained, the system may use current (or real-time) event information to determine potential opportunities to leverage based on discrepancies between predicted odds of upcoming events and the actual odds for those events.

18 Claims, 6 Drawing Sheets

USING MACHINE LEARNING AND HISTORICAL EVENT DATA TO LEVERAGE PREDICTED ODDS FOR FUTURE EVENTS

CROSS-REFERENCE TO RELATED APPLICATIONS

This application is a non-provisional application, and claims the benefit of provisional U.S. Patent Application No. 63/272,137, filed Oct. 26, 2021, which is hereby incorporated by reference it its entirety.

BACKGROUND

Machine learning techniques are often used to perform predictions in a variety of fields. These predictions may involve making predictions for the outcomes of events. Typically, when odds are determined for an event, vast amounts of data are used to determine odds. However, odds for events are not always reflective of the real and accurate probability of outcomes. For example, odds may be altered by an entity (e.g., bookmaker) to attempt to balance incurred risk. Accordingly, there are opportunities to potentially leverage discrepancies between odds associated with an event and the probability of an outcome.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

In some embodiments, described is a system (and method) for using machine learning and historical event data to leverage predicted odds for future events. In some embodiments, the system may train and use machine learning models to identify potential discrepancies between predicted odds and actual odds for a future (or upcoming) event. In addition, the system may determine an appropriate risk value amount to leverage when these potential discrepancies are identified. For example, given a defined set of resources (e.g., funds), the system may attempt distribute the resources to capitalize on such discrepancies without unduly limiting the total amount of funds based on a single event.

In one embodiment, the plurality of machine learning models each comprise a neural network. The plurality of machine learning models may each comprise a convolutional neural (CNN) network layer that accepts as input predictive variables associated with past events and historical odds as dependent variables input into the CNN. When the machine learning model are neural networks, the machine learning model may be trained using backpropagation, such as by modifying one or more neural network node weights using gradient descent starting from the last neural network layer and progressing backwards through the neural network layers until the first neural network layer is reached. Neural networks may be comprised of a plurality of neural network nodes, where each node includes input values and calculates an activation function on the input values. The activation function may be a non-linear function computed on a weighted sum of the input values plus an optional constant. In some embodiments, the activation function is logistic, sigmoid, rectifier, or a hyperbolic tangent function. Neural network nodes may be connected to each other such that the output of one node is the input of another node. Moreover, neural network nodes may be organized into layers, each layer comprising one or more nodes.

To provide such a capability, the system may create a predicted odds machine learning model and a risk management machine learning model. To create the predicted odds machine learning model, the system may perform a specialized process that uses an ensemble machine learning training algorithm. In some embodiments, the system may use predictive variables associated with past events and historical odds for outcomes of the past events, as input, to train the predicted odds machine learning model. The training of the predicted odds machine learning model may include an ensemble training algorithm that includes training multiple linear regression models by implementing forward stepwise variable selection using the predictive variables, bootstrap aggregation, and objective function noise injection. The system may then determine an average model from the multiple linear regressions models and adjust the average model on per-venue basis.

To create the risk management machine learning model, the system may determine a set of past odds differences between predicted odds outputted by the predicted odds machine learning model for past events and the actual historical odds for those past events. The system may then use the set of past odds differences and actual outcomes of the past events as input to train the risk management machine learning model using a linear regression algorithm.

Once the predicted odds machine learning model and risk management machine learning model are trained (e.g., as a convolutional neural network), the system may use current (or real-time) event information to determine potential opportunities to leverage based on discrepancies between predicted odds of upcoming events and the actual odds for those events. More specifically, the system may determine predicted odds for a particular upcoming event by inputting a set of predictive variables associated with the upcoming event into the predicted odds machine learning model. Next, the system may determine a current odds difference between the determined predicted odds for the upcoming event and the current odds for the event. Finally, the system may determine the specialized risk value associated with the upcoming event by inputting the current odds difference into the risk manager model.

Figure 1:
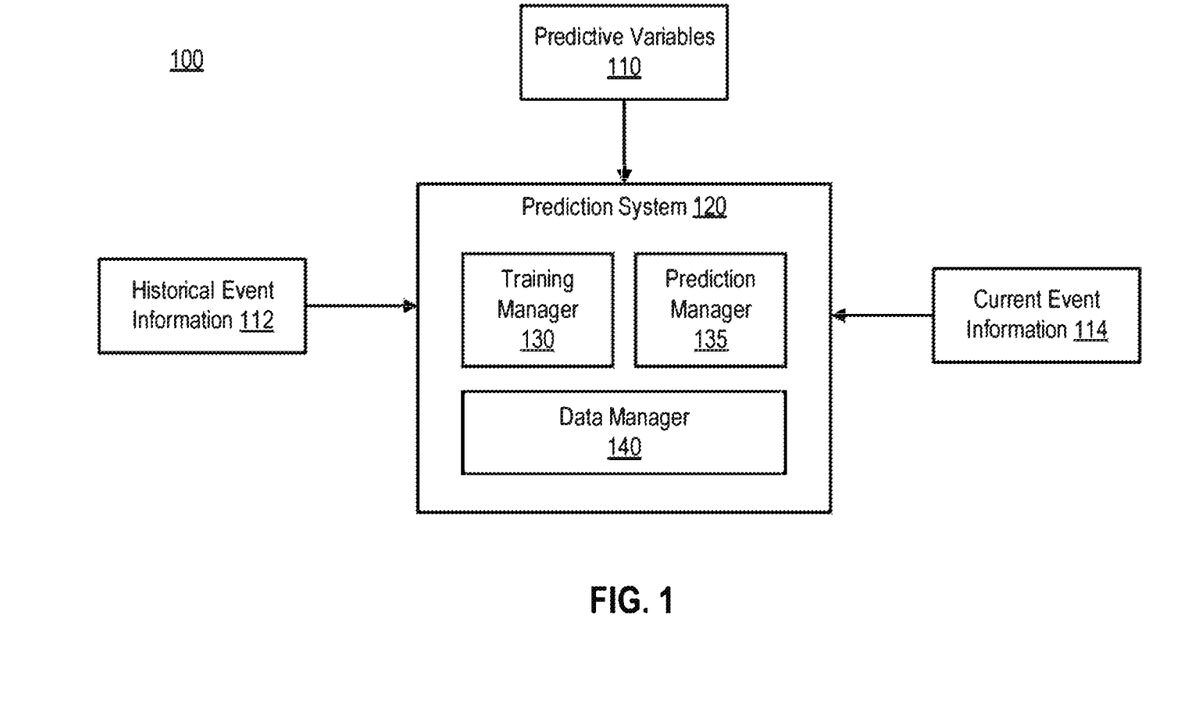
FIG. 1 is a diagram illustrating an example of a system that may be used in conjunction with one or more embodiments of the disclosure.

FIG. 1 is a diagram illustrating an example of a system that may be used in conjunction with one or more embodiments of the disclosure.

The operating environment 100 can be a system of one or more computing systems (as further described herein) including software executing a process (or method). In some embodiments, the operating environment 100 may take the form of an on-premises environment, cloud-based environment, or a combination thereof. In addition, these environments may take the form of an operating environment 100 that is partly, or completely, virtualized. It should be noted that the components of operating environment 100 may interact via a network, which may be any type of wired or wireless network including a local area network (LAN), a wide area network (WAN), or a direct communication link, or other suitable connection.

The prediction system 120 may include various components that implement machine learning techniques to leverage predicted odds for an event as further described herein. As shown, the prediction system 120 may include a training manager 130 that manages the training of various types of machine learning models (e.g., regression models), a prediction manager 135 that utilizes the trained machine learning models to predict odds for outcomes of an event, and a risk manager 137 that manages risk when leveraging potential differences between the odds predicted by the system 120 and the actual odds of upcoming events.

The prediction system 120 may include a data manager 140 that manages the collection of data (or information) used to perform odds prediction. This data may be stored in one or more databases, and the prediction system 120 may be in communication with, or maintain, these databases. More specifically, the data used by the prediction system 120 to predict odds for an event may include predictive variables 110, historical event information (or data, metadata, etc.) 112, and current event information (or data, metadata, etc.) 114. In some embodiments, some or all of the data may be received from third-parties, for example, as part of data subscription service.

The predictive variables (or terms) 110 may be used to predict odds for an outcome of an event. The predictive variables 110 may be any type of data that may be associated with the outcome of an event, and may be in the form of a numerical value. In some embodiments, the predictive variables 110 may include various statistics associated with past events of a particular participant (or entity, subject, etc.). For example, the predictive variables 110 may be various statistics derived from games of a particular team.

The predictive variables 110 may be associated with the historical event information 112 and current event information 114. The historical event information 112 may include information associated with past events such as event information, associated participants, venue information, dates, historical odds for the past events, and actual outcomes of the past events. As further described herein, the predictive variables 110 and associated historical event information 112 may be inputted into various machine learning models as part of a training process.

The predictive variables 110 may also be associated with the current (e.g., real-time, etc.) event information 114. The current event information may include information associated with upcoming (or future) events such as event information, associated participants, venue information, dates, and current (or real-time) odds for the outcome of the events. For example, the current event information 114 may correspond to (e.g., match) the historical event information 112 minus the outcome information as the events are yet to be completed.

The prediction system 120 may also provide one or more user interfaces to access the predictions, and to configure various setting such as those related to the machine learning algorithms, data inputs, data sources, etc. The user interfaces may include various graphical user interfaces, various services (e.g., web services), and application programming interfaces (APIs), etc. Accordingly, the prediction system 120 may process the data to train machine learning components, and to perform real-time odds prediction as further described with reference to FIG. 2.

Figure 2:
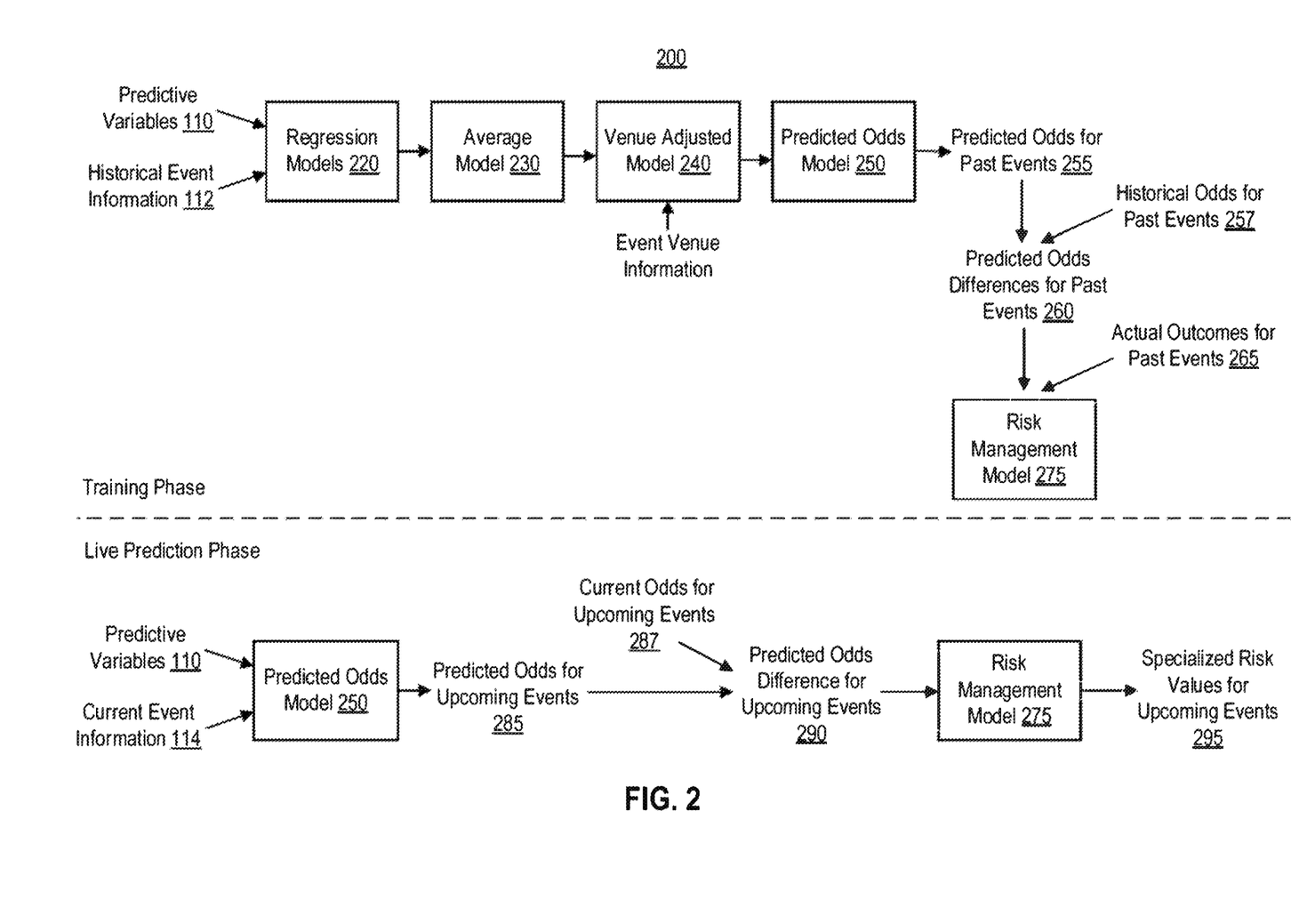
FIG. 2 is a process flow diagram illustrating an example process of creating and leveraging an odds prediction model according to one or more embodiments of the disclosure.

FIG. 2 is a process flow diagram illustrating an example process of creating and leveraging an odds prediction model according to one or more embodiments of the disclosure. Process 200 may use processing logic, which may include software, hardware, or a combination thereof. For example, process 200 may be performed by a system including one or more components described in environment 100.

Initially, as shown, predictive variables 110 and historical event information 112 may be used by the system (e.g., prediction system 120) as part of a process (e.g., training phase) to train various machine learning models. In some embodiments, the final odds prediction model (e.g., model 250) may be the result of a specialized training procedure that involves multiple steps (or iterations) and/or adjustments. In some embodiments, the predicted variables 110 may include a set of derived predictive variable. The system may create the derived predictive variables (or derived predictive terms) by applying various processing techniques to the predictive variables such as a z-score, low-pas filter (e.g., with a cutoff of 0), high-pass filter (e.g., with a cutoff of 0), or a combination thereof.

Next, a set of regression models 220 may be trained. In some embodiments, the set of regression models 220 may be linear regression models. For example, the set of regression models 220 may be formed from 20-50 linear regression models. As shown, as part of the process to train the regression models 220, the system may use the predictive variables 110, which may include the derived predictive variables, and the historical event information 112 as input. In some embodiments, the historical event information 112 may include historical odds. For example, the predictive variables 110 may be used as independent variables (or predictors, features, etc.) and the associated (or corresponding) historical odds for past events may be used as a dependent variable (or target, outcome, etc.). In other words, the system may perform to procedure to fit linear regressions of the predictive variables 110 against the historical odds. When training the linear regression models 220, the system may use any suitable machine learning components (e.g., software library) and related configuration procedures (or operations, functions, methods, etc.). When performing and/or configuring the training of the regression models 220, the system may use an ensemble method (or technique) to leverage multiple machine learning algorithms. In some embodiments, the training algorithm used for the regression models 220 may include a forward stepwise variable selection based on the predictive variables 110. In some embodiments, the training algorithm may also include bootstrap aggregating (or bagging). In some embodiments, the training algorithm may also include objective function noise injection. For example, the noise injection may include Gaussian noise. In addition, in some embodiments, the noise injection may be performed with cross-validation and a tuned multiplier. Accordingly, when configuring the training procedure (or algorithm) the system may specify the various techniques that form the ensemble method.

Next, the system may determine an average model 230 from the set of linear regression models 220. In other words, the created set of linear regression models 220 may be averaged into a single average model 230. The system may determine (or create, calculate, etc.) the average model 230 using any suitable averaging technique. Next, the system may adjust (or modify, update, tune, etc.) the average model 230 on a per-venue basis. As shown, the system may obtain the venue information and adjust the average model 230 to create an adjusted model 240. In some embodiments, the system may perform a per-venue adjustment of the average model 230 using a linear regression. Accordingly, after performing the various steps described above, the result is the creation of the predicted odds machine learning model 250. In other words, as shown in the embodiment of FIG. 2, the predicted odds machine learning model 250 may be created after performing the per-venue adjustment (e.g., model 240). However, it should be noted that in some embodiments, the predicted odds machine learning model 250 may be created without necessarily performing all the described steps. For example, the predicted odds machine learning model 250 may be created after determining an average model (e.g., average model 230) instead.

Having now created the predicted odds machine learning model 250, the system may predict odds for upcoming events. In addition, the system may determine potential differences between predicted odds of upcoming event and the actual odds of those events. The system may also attempt to identify opportunities to leverage (e.g., take advantage of) any deemed discrepancies (or divergences, inconsistencies, etc.) between such odds. To leverage such potential discrepancies, the system may further train a risk management machine learning model 275. For example, given a defined set of resources (e.g., funds), the risk management machine learning model 275 may attempt distribute the resources to capitalize on the discrepancies between the predicted odds and actual odds of an upcoming event without unduly limiting the total amount of funds based on a single event. Continuing with the example of diagram 200, after training, the predicted odds machine learning model 250 may output predicted odds for past events 255. The system may then compare these predicted odds 255 to the historical odds for the past events 257, to determine predicted odds differences 260. Next, the system may perform an analysis between the predicted odds differences 260 and the actual event outcomes 265 using a linear regression model. As a result of such analysis, the system may create a risk management machine learning model 275.

The trained models may now be used with real-time information for upcoming events (e.g., live prediction phase). As shown, the predictive variables 110 and the current event information 114 may be input into the predicted odds machine learning model 250, which then outputs predicted odds for upcoming events 285. The system may then determine a difference between the predicted odds 285 with the actual odds for the upcoming event 287 and determine an odds difference for an upcoming event 290. The odds difference 290 may then be inputted into the risk management machine learning model 275 to output specialized risk values for the upcoming events 295. Accordingly, the system may use machine learning to leverage predicted odds for events.

Figure 3:
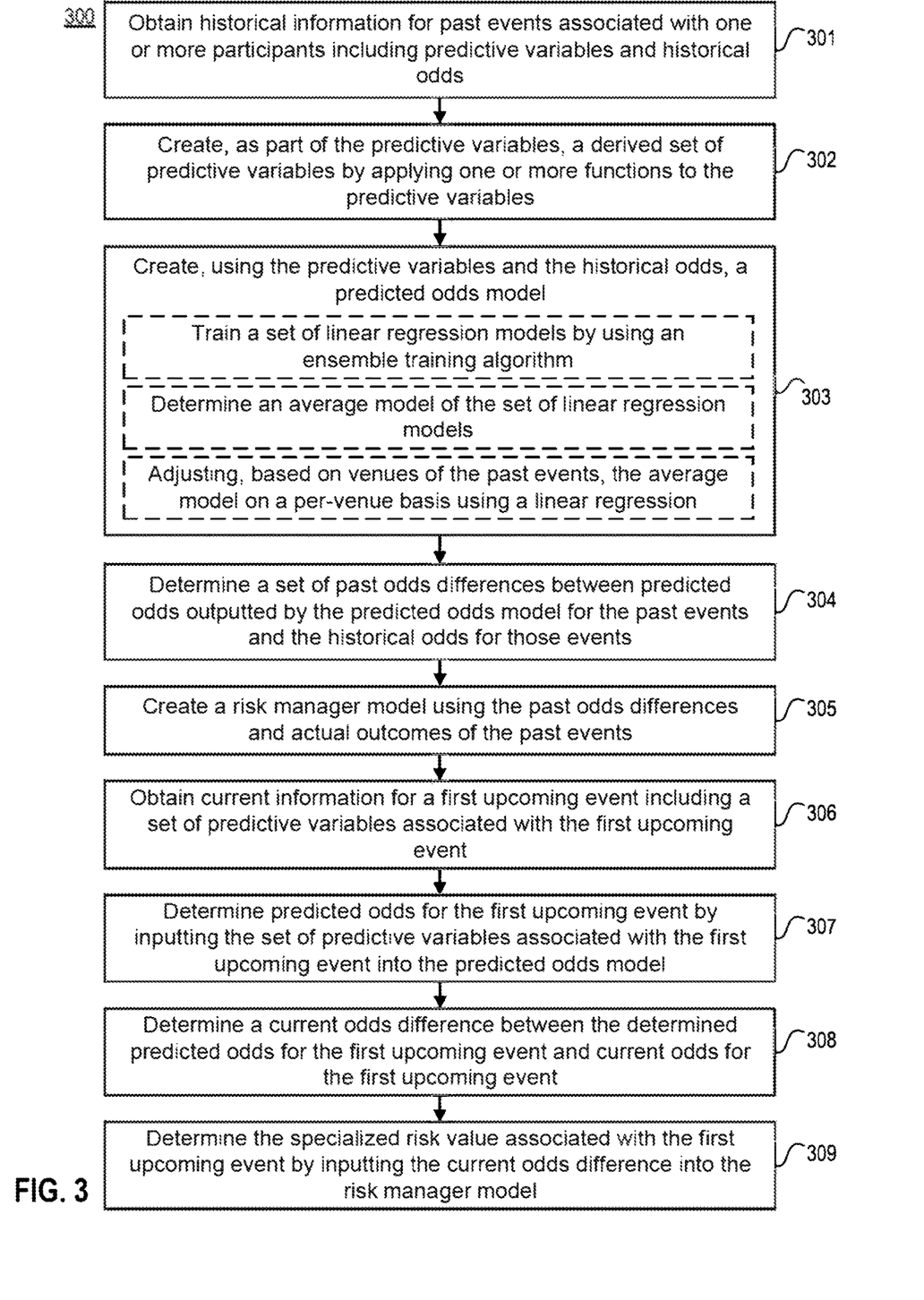
FIG. 3 is a process flow diagram illustrating an example method of predicting odds for an event according to one or more embodiments of the disclosure.

FIG. 3 is a process flow diagram illustrating an example method of predicting odds for an event according to one or more embodiments of the disclosure. Process 300 may use processing logic, which may include software, hardware, or a combination thereof. For example, process 300 may be performed by a system including one or more components described in environment 100.

In step 301, the system may obtain historical information for past events associated with one or more participants. The historical information may include predictive variables (e.g., predictive variables 110) associated with the past events, and historical odds for outcomes of the past events. In addition, the historical information may also include actual outcomes of the past events, and other information such as venue information for the past events.

In step 302, the system may create a derived set of predictive variables by applying one or more functions to the predictive variables. In some embodiments, the functions may include one or more of a z-score function, a low-pass filter, or a high-pass filter. In some embodiments, the derived set of predictive variables may be included as part of the predictive variables. In other words, in such embodiments, the derived set of predictive variables may be used as input to create the predicted odds machine learning model as further described in operation 303.

In step 303, the system may create a predicted odds machine learning model using the predictive variables as independent variable input and the historical odds as dependent variable input. In some embodiments, creating the predicted odds machine learning model (e.g., model 250) may include using an ensemble training algorithm. More particularly, in some embodiments, creating the predicted odds machine learning model may include training a set of linear regression models by implementing forward stepwise variable selection using the predictive variables. In addition, in some embodiments, training the set of linear regression models may further include performing bootstrap aggregation. In some embodiment, training the set of linear regression models may also include performing objective function noise injection. For example, the objective function noise injection may include Gaussian noise. In addition, the objective function noise injection may include implementing cross-validation and a tuned multiplier.

In some embodiments, creating the predicted odds machine learning model may also include determining an average model (e.g., model 230) of the set of linear regression models.

In some embodiments, creating the predicted odds machine learning model may also include adjusting, based on venues of the past events, the average model on a per-venue basis using a linear regression (e.g., to create model 240).

In step 304, the system may determine a set of past odds differences between predicted odds outputted by the predicted odds machine learning model for one or more of the past events and the historical odds for the one or more past events.

In step 305, the system may create a risk manager machine learning model (e.g., model 275) that determines a specialized risk value by training a linear regression model using the set of past odds differences as independent variable input and actual outcomes of the past events as dependent variable input.

As described, the system may then use the created model to perform real-time predictions and analysis as described in operations steps 306-309.

In step 306, the system may obtain current information (e.g., current event information 114) for at least a first upcoming event associated with the one or more participants. In some embodiments, the current information may include a set of predictive variables associated with the first upcoming event. In addition, the current information may also include the current odds for the first upcoming event.

In step 307, the system may determine predicted odds for the first upcoming event by inputting the set of predictive variables associated with the first upcoming event into the predicted odds machine learning model. In some embodiments, the predictive variable associated with the first upcoming event may be predictive variables that are updated since the time of the training. For example, the training may be performed weekly, and the predictive variables associated with the first upcoming event may be current to the present day.

In step 308, the system may determine a current odds difference between the determined predicted odds for the first upcoming event and current odds for the first upcoming event. In some embodiments, the current odds for the first upcoming event may be provided in real-time. For example, the current odds may be provided just prior to the event. In addition, the current odds may reflect odds that may be dynamically changing during the course of the event.

In step 309, the system may determine the specialized risk value associated with the first upcoming event by inputting the current odds difference into the risk manager model. In some embodiments, the specialized risk value may include an investment (or wagering, bet, etc.) amount. Accordingly, in some embodiments, the system may initiate an automated wager for the first upcoming event based on the specialized risk value.

The system (and methods) described in embodiments may be used to make and leverage predictions in a wide range of environments including financial, and business environments, among many others. For example, the system may be used to predict odds on sporting events. For instance, the predictive variables may include historical statistics associated with a particular team and the historical odds may be odds for completed games of the team. Accordingly, the system may train the predicted odds machine learning model to predict odds for upcoming games of the team. As a result, the risk management machine learning model may output a specialized risk value for an upcoming event in the form of a wager. In other words, the system described in some embodiments herein, may attempt to leverage discrepancies between the actual odds of an upcoming event and the predicted odds to identify favorable instances to wager on the outcomes of an event.

Real-Time Gait Determination

In some embodiments, the system may obtain real-time gait information using gait sensors physically attached to a particular participant involved in an activity. A gait of a human or an animal generally refers to a pattern of limb movements made during locomotion. Gait sensors could be attached in pairs to a participant, such as a right gait sensor being placed and attached on a right ankle of a human participant, and a left gait sensor being placed and attached on left ankle of a human participant. In another example, a right gait sensor could be placed and attached near the left, front hoof of a horse, and a left rear gait sensor could be placed and attached near the left, rear hoof of a horse. In some embodiments, four gait sensors could be placed on each of the four legs of a participant.

In some embodiments, the real-time gait sensor may include a two or more gait sensors that are used to obtain gait information of the participant. Each gait sensor of a gait sensor pair may include a unique identifier, an accelerometer, gyroscope, a processor, proximity sensors, an onboard clock, GPS or GNSS location subsystem and a wireless communication subsystem. Prior to an activity of the participant, the gait sensor pairs are activated. The gait sensor pairs produce accelerometer and/or gyroscopic data, proximity sensor, and location data for a particular participant while the participant is moving about. In some embodiments, the pair of gait sensors for participants use onboard clocks synchronized clocks set to same time. The gait senor may include a water-proof housing with the electronic circuitry and battery enclosed in the water-proof housing, such as a rectangular box made of a plastic or metal material. The water-proof housing may include connecters on either side of the water-proof housing in which a strap may be affixed and adjusted to position and secure the water-proof housing to a participant.

The pair of gait sensors may determine a proximity to one another using Bluetooth® or other enabled proximity determination sensors. In other words, the pair of gait sensors may determine how fair apart the sensors are from one another. The gait sensors may produce data indicating the distance between the pair of gait sensors.

The system receives the data generated from the gait sensors attached to the participants. For example, the system processors are configured to receive for nth particular participants, a first data stream of accelerometer data and location data from a first gait sensor of the gait sensor pair, and a second data stream of accelerometer data and location data from a second gait sensor of the gait sensor pair. The received gait sensor data provides near real time movement information of the one or more participants.

Figure 4:
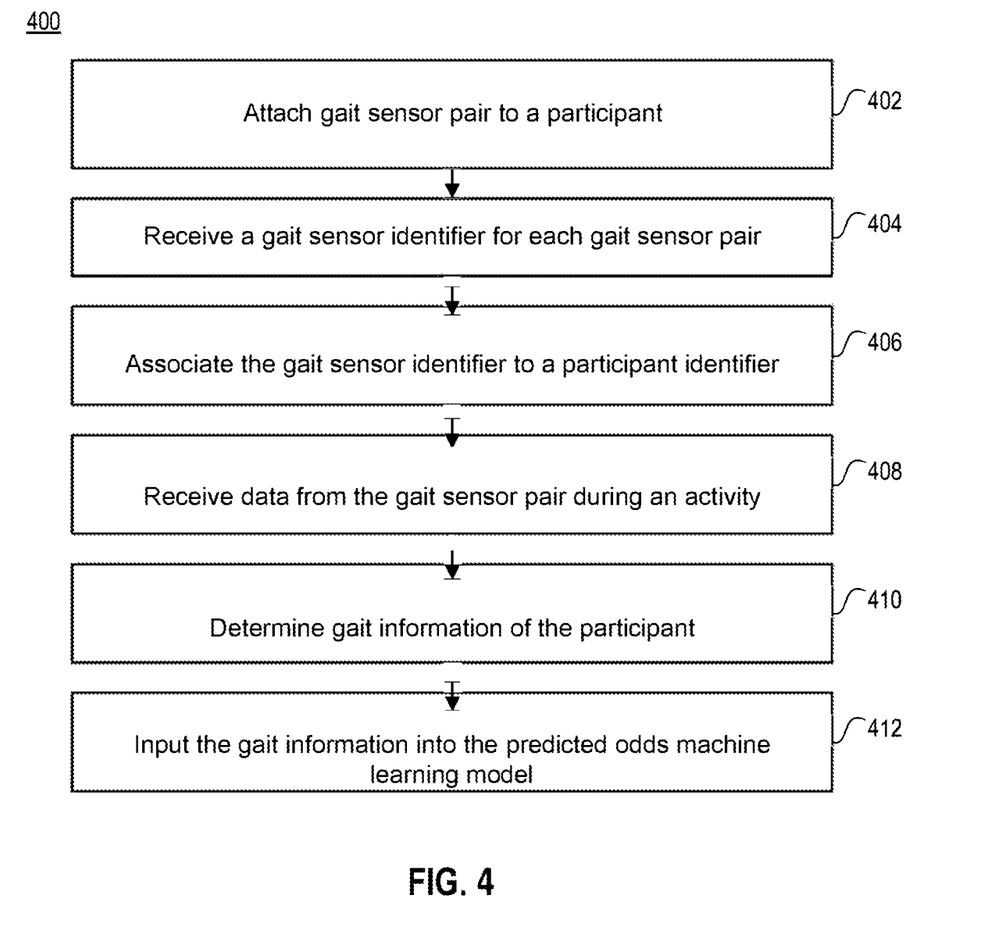
FIG. 4 is a process flow diagram illustrating an example method of using gait sensors to obtain real-time gait information of a participant.

FIG. 4 is a process flow diagram illustrating an example method of using gait sensors to obtain real-time gait information of a participant. Process 400 may use processing logic, which may include software, hardware, or a combination thereof. For example, process 400 may be performed by a system including one or more components described in environment 100.

In step 402, a pair of gait sensors are attached one or more participants participating in an activity. The pair of gait sensors are attached to different limbs of the participant.

In step 404, the system receives a sensor identifier for each gait sensor pair. When the gait sensors are activated, the system may present a user interface depicting each of the sensor identifiers.

In step 408, the system associates the sensor identifier to a participant identifier. Table 1 below illustrates an example of an associate of participant identifiers and gait sensor identifiers to a particular participant. The system may provide a user interface where the participant identifier are displayed when activated and the a user may select the sensor identifiers and assign a participant identifier to the selected sensor identifiers. The associated participant identifiers to the gait sensor identifiers may then be stored by the system in a database.

TABLE 1

| Participant ID | Gait Sensor ID | Gait Sensor ID |
| --- | --- | --- |
| 100010 | ABX332 | ABX328 |
| 100011 | ABX327 | ABX322 |
| 100012 | ABX412 | ABX320 |

In some embodiments, the system after associating the Gait Sensor IDs to a Participant ID, may send an activation command to the respective gait sensors. The activation command may include the pairing information such that each gait sensor knows the value of the gait sensor identifier for which it is paired. The gait sensors may then communicate directly with each other via a wireless communication system, such a Bluetooth® enabled wireless subsystem. Each gait sensor may then determine its proximity to its paired counterpart (e.g., determining a distance value).

In step 408, the system receives data from the sensor pair during an activity. During an activity, the system receives sensor data gaits sensors attached to the participants of the activity.

In step 410, the system may determine gait information of the participant. Based on the received sensor data, the system may determine a real-time gait, movements speed, and a real-world location of the participant.

In step 412, the system inputs the gait information into the predicted odds machine learning model. In some embodiments, movement information of the participant is input as an additional set of predictive variables into the predicted odds machine learning model. In some embodiments, the data streams of the participant's accelerometer data and location data, are input into a predictive model which determines a real-time gait and an average gate over a period of time for the particular participant.

In some embodiments, the predicted odds machine learning model may be trained and configured to receive real-time gait information and/or movement information of a participant. The real-time gait information and/or movement information may be used to weight the output of the predicted odds machine learning model. For example, where gait of the participant may be greater than a pre-assigned normal gait for the participant. Where the real-time gait of the participant exceeds the pre-assigned normal gait of the participant, the predicted odds machine learning model may weight or increase the odds of the participant winning the particular activity. Conversely, where the real-time gait of the participant falls below the pre-assigned normal gait of the participant, the predicted odds machine learning model may weight or decrease the odds of the participant losing the activity.

Figure 5:
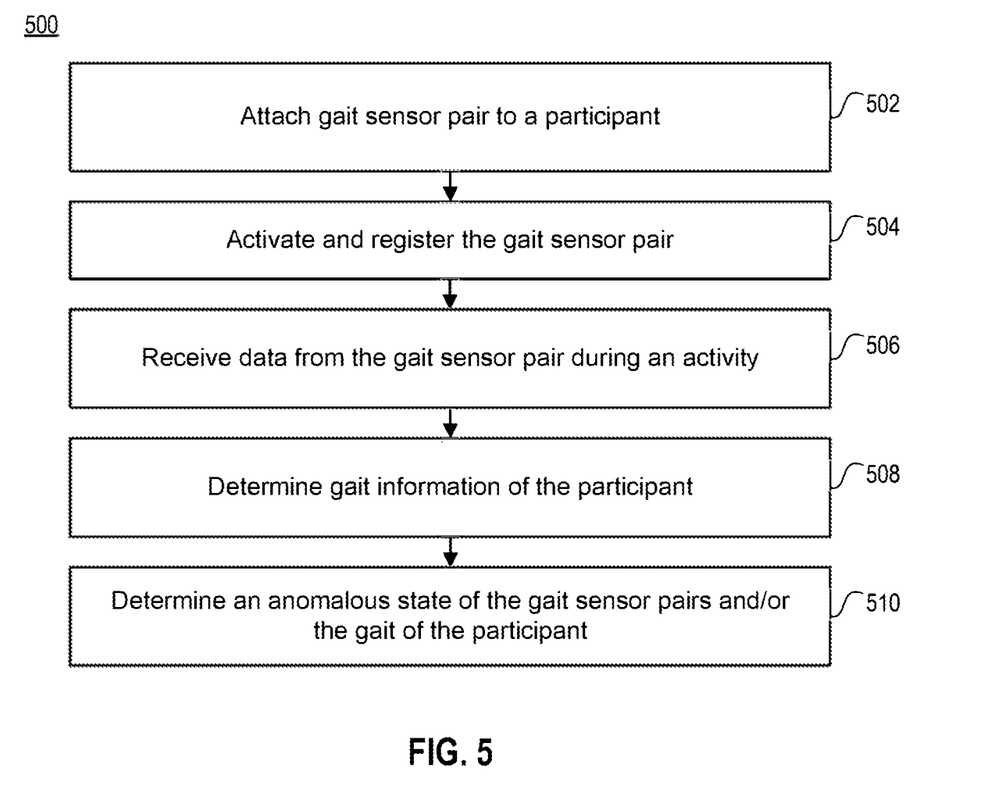
FIG. 5 is a process flow diagram illustrating an example method of receiving gait sensor information for a participant and determining a gait sensor anomaly.

FIG. 5 is a process flow diagram illustrating an example method of receiving gait sensor information for a participant and determining a gait sensor anomaly. Process 500 may use processing logic, which may include software, hardware, or a combination thereof. For example, process 500 may be performed by a system including one or more components described in environment 100.

In step 502, a pair of gait sensors are attached one or more participants participating in an activity. The pair of gait sensors are attached to different limbs of the participant.

In step 504, the pair of gait sensors are activated and the system registers the gait sensors as a pair and associates the sensors to the participant. For example, the system may associate each gait sensor pair's unique identifier with a unique identifier of a particular participant of the one or more participants.

In step 506, during the course of an activity, the system wirelessly receives data from the gait sensor pair. For example, the system may receive time data including accelerometer data, gyroscope data, GPS/location data, battery life data, and sensor proximity data.

In step 508, the system may determine a gait of the participant. For example, the system may evaluate the incoming data stream of the gait sensor pair for the particular participant. Based on this received data stream, the system may determine the motion and movement speed of the limbs of the participant. The time and proximity of the gait sensors over the course of a time period may be used to calculate an average gait and speed of the participant.

In step 510, the system may determine an anomalous of the gait sensor pairs and/or the gait of the participant. In some embodiments, the system may determine that the first gait sensor is greater than a predetermined threshold distance from the second gait sensor (such as the threshold distance being greater than 5 feet from each other). The system may be configured to automatically set the predetermined threshold distance based on the type of the participant (e.g., whether the participant is a human or a particular type of animal). The system may determine based on the received gait sensor data whether the first gait sensor or the second gait sensor has been attached to a participant other than the particular participant. For example, the pair of gait sensors may be removed from a participant during a break in an activity, and the pair of gait sensors or an individual gait sensor may be incorrectly attached to a different participant than the original participant. In response to determining an anomalous state of the pairs of gait sensors, the system may generate a warning message, via a user interface of the system, indicating an out of bounds range of the proximity of the first gait sensor and the second gait sensor being greater than the threshold distance.

In some embodiments, based on the determined gait of the particular participant, the system may determine whether the gait of the participant is a normal gait or a non-normal gait for the particular participant. The system may assign a normal gait value for a participant for an activity, such as running. The assigned normal gait value may indicate the normal movement of the limbs of the participant while running. With the obtained gait sensor data, the system may determine whether the limbs are moving at the predetermined normal gait by determined a real-time gait and then comparing the real-time gait with the predetermined normal gait. In response to determining an whether the limbs are moving at the predetermined gait, the system may generate an informational message, via a user interface of the system, indicating that the participant is moving at a gait outside of the normal gait for the activity.

Figure 6:
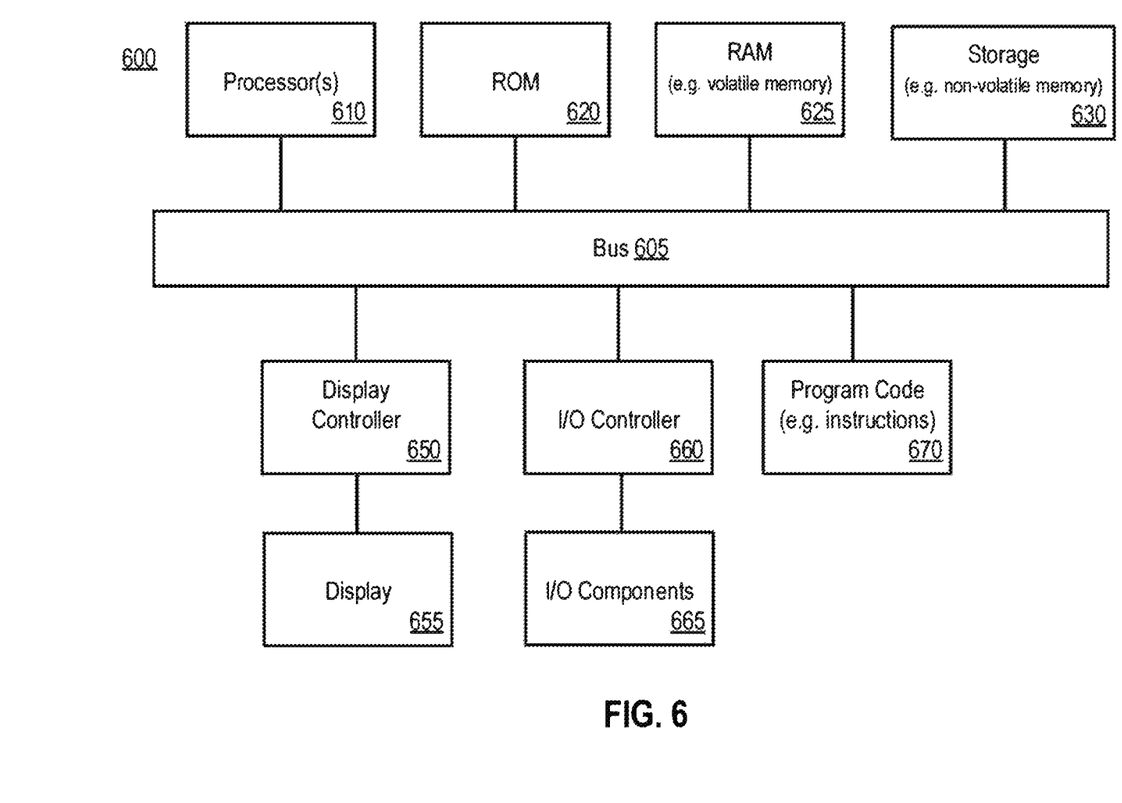
FIG. 6 is a block diagram illustrating an example of a computing system that may be used in conjunction with one or more embodiments of the disclosure.

FIG. 6 shows a block diagram of an example of a computing system that may be used in conjunction with one or more embodiments of the disclosure. For example, computing system 400 (or system, or server, or computing device, or device) may represent any of the devices or systems (e.g., system 120, environment 100, etc.) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 600 may include a bus 605 which may be coupled to a processor 610, ROM (Read Only Memory) 620, RAM (or volatile memory) 625, and storage (or non-volatile memory) 630. The processor(s) 610 may retrieve stored instructions from one or more of the memories 620, 625, and 630 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 610 may perform operations in an on-demand or "cloud computing" environment or as a service (e.g., within a "software as a service" (SaaS) implementation). Accordingly, the performance of operations may be distributed among the one or more processors 610, whether residing only within a single machine or deployed across a number of machines. For example, the one or more processors 610 may be located in a single geographic location (e.g., within a home environment, an office environment, or a server farm), or may be distributed across a number of geographic locations. The RAM 625 may be implemented as, for example, dynamic RAM (DRAM), or other types of memory that require power continually in order to refresh or maintain the data in the memory. Storage 630 may include, for example, magnetic, semiconductor, tape, optical, removable, non-removable, and other types of storage that maintain data even after power is removed from the system. It should be appreciated that storage 630 may be remote from the system (e.g., accessible via a network).

A display controller 650 may be coupled to the bus 605 in order to receive display data to be displayed on a display device 655, which can display any one of the user interface features or embodiments described herein and may be a local or a remote display device. The computing system 600 may also include one or more input/output (I/O) components 665 including mice, keyboards, touch screen, network interfaces, printers, speakers, and other devices. Typically, the input/output components 665 are coupled to the system through an input/output controller 660.

Program code 670 may represent any of the instructions, applications, software, libraries, toolkits, modules, components, engines, units, functions, logic, etc. as described herein (e.g., system 120, manager 130/135, models, etc.). Program code 670 may reside, completely or at least partially, within the memories described herein (e.g., non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 670 can be implemented as software, firmware, or functional circuitry within the computing system, or as combinations thereof. Program code 670 may also be downloaded, in whole or in part, through the use of a software development kit or toolkit that enables the creation and implementation of the described embodiments.

It will be appreciated that the present disclosure may include any one and up to all of the following examples.

Example 1. A system comprising: one or more processors; and a non-transitory computer-readable medium storing a plurality of instructions, which when executed, cause the one or more processors to: obtain historical information for past events associated with one or more participants including predictive variables associated with the past events, and historical odds for outcomes of the past events; create, using the predictive variables as independent variable input and the historical odds as dependent variable input, a predicted odds machine learning model including: training a set of linear regression models by implementing forward stepwise variable selection using the predictive variables; and determining an average model of the set of linear regression models; obtain current information for at least a first upcoming event associated with the one or more participants including a set of predictive variables associated with the first upcoming event; and determine predicted odds for the first upcoming event by inputting the set of predictive variables associated with the first upcoming event into the predicted odds machine learning model; wherein the odds machine learning model is a trained neural network.

Example 2. The system of Example 1, wherein the plurality of instructions, when executed, further cause the one or more processors to: determine a set of past odds differences between predicted odds outputted by the predicted odds machine learning model for one or more of the past events and the historical odds for the one or more past events; and create a risk manager machine learning model that determines a specialized risk value by training a linear regression model using the set of past odds differences as independent variable input and actual outcomes of the past events as dependent variable input; wherein the odds machine learning model is a trained neural network.

Example 3. The system of any of Examples 1-2, wherein the plurality of instructions, when executed, further cause the one or more processors to: determine a current odds difference between the determined predicted odds for the first upcoming event and current odds for the first upcoming event; and determine the specialized risk value associated with the first upcoming event by inputting the current odds difference into the risk manager model.

Example 4. The system of any of Example 1-3, wherein the plurality of instructions, when executed, further cause the one or more processors to: initiate an automated wager for the first upcoming event based on the specialized risk value.

Example 5. The system of any of Example 1-4, wherein the plurality of instructions, when executed, further cause the one or more processors to: create, as part of the predictive variables, a derived set of predictive variables by applying one or more functions to the predictive variables, the functions including one or more of a z-score function, a low-pass filter, or a high-pass filter.

Example 6. The system of any of Examples 1-5, wherein creating the predicted odds machine learning model further includes: adjusting, based on venues of the past events, the average model on a per-venue basis using a linear regression.

Example 7. The system of any of Examples 1-6, wherein training the set of linear regression models further implements performing bootstrap aggregation.

Example 8. The system of any of Examples 1-7, wherein training the set of linear regression models further implements performing objective function noise injection.

Example 9. The system of any of Examples 1-8, wherein the objective function noise injection includes Gaussian noise.

Example 10. The system of any of Examples 1-9, wherein the objective function noise injection includes cross-validation and a tuned multiplier.

Example 11. The system of any of Examples 1-10, further comprising: a plurality of gait sensors pairs, each gait sensor of a gait sensor pair comprising: a unique identifier, an accelerometer, a processor, an onboard clock and a wireless communication subsystem, and wherein each gait sensor pair unique identifier is associated with a unique identifier of a particular participant of the one or more participants, and wherein the gait sensor pairs produce accelerometer data and location data for a particular participant, wherein each of the onboard clocks are synchronized to the same time; wherein the processors are further configured to receive for a particular participant, a first data stream of accelerometer data and location data from a first gait sensor of the gait sensor pair, and a second data stream of accelerometer data and location data from a second gait sensor of the gait sensor pair; wherein the received data provides near real time movement information of the one or more participants; and inputting the movement information as an additional set of predictive variables into the predicted odds machine learning model.

Example 12. The system of any of Examples 1-11, wherein the processors are further configured to: determine that the first gait sensor is greater than a predetermined threshold distance from the second gait sensor, the threshold distance being greater than 5 feet; and determining either whether the first gait sensor or the second gait sensor has been attached to a participant other than the particular participant, and generating a warning message indicating an out of bounds range of the proximity of the first gait sensor and the second gait sensor being greater than the threshold distance.

Example 13. The system of any of Examples 1-12, wherein the processors are further configured to: inputting the data streams of accelerometer data and location data into a predictive model.

Example 14. The system of any of Examples 1-13, wherein the processors are further configured to: based on the determined gait of the particular participant evaluating whether the gait is outside of an average or normal gait for the type of the particular participant.

Example 15. The system of Examples 1-14, wherein the processors are further configured to: based on the gait information of the particular participant evaluating whether the gait of the particular participant is outside of an average or normal gait for a type of activity being performed by the particular participant.

Example 16. A computer-implemented method for comprising: obtaining historical information for past events associated with one or more participants including predictive variables associated with the past events, and historical odds for outcomes of the past events; creating, using the predictive variables as independent variable input and the historical odds as dependent variable input, a predicted odds machine learning model including: training a set of linear regression models by implementing forward stepwise variable selection using the predictive variables; and determining an average model of the set of linear regression models; obtaining current information for at least a first upcoming event associated with the one or more participants including a set of predictive variables associated with the first upcoming event; and determining predicted odds for the first upcoming event by inputting the set of predictive variables associated with the first upcoming event into the predicted odds machine learning model.

Example 17. The method of Example 16, further comprising: determining a set of past odds differences between predicted odds outputted by the predicted odds machine learning model for one or more of the past events and the historical odds for the one or more past events; and creating a risk manager machine learning model that determines a specialized risk value by training a linear regression model using the set of past odds differences as independent variable input and actual outcomes of the past events as dependent variable input.

Example 18. The method of any of Example 16-17, further comprising: determining a current odds difference between the determined predicted odds for the first upcoming event and current odds for the first upcoming event; and determining the specialized risk value associated with the first upcoming event by inputting the current odds difference into the risk manager model.

Example 19. The method of any of Examples 16-18, further comprising: initiating an automated wager for the first upcoming event based on the specialized risk value.

Example 20. The method of any of Examples 16-19, further comprising: creating, as part of the predictive variables, a derived set of predictive variables by applying one or more functions to the predictive variables, the functions including one or more of a z-score function, a low-pass filter, or a high-pass filter.

Example 21. The method of any of Examples 16-20, wherein creating the predicted odds machine learning model further includes: adjusting, based on venues of the past events, the average model on a per-venue basis using a linear regression.

Example 22. The method of any of Examples 16-21, wherein training the set of linear regression models further implements performing bootstrap aggregation.

Example 23. The method of any of Examples 16-22, wherein creating the predicted odds machine learning model further includes: adjusting, based on venues of the past events, the average model on a per-venue basis using a linear regression.

Example 24. The method of any of Examples 16-23, wherein training the set of linear regression models further implements performing objective function noise injection.

Example 25. The method of any of Examples 16-24, wherein the objective function noise injection includes Gaussian noise.

Example 26. The method of any of Examples 16-25, wherein the objective function noise injection includes cross-validation and a tuned multiplier.

Example 27. The method of any of Examples 16-26, further comprising: providing a plurality of gait sensors pairs, each sensor of the gait sensor pair comprising: a unique identifier, an accelerometer, a processor, an onboard clock and a wireless communication subsystem, and wherein each sensor pair unique identifier is associated with a unique identifier of a particular participant of the one or more participants, and wherein the sensor pairs produce accelerometer data and location data for a particular participant, wherein each of the onboard clocks are synchronized to the same time; receiving for a particular participant, real-time movement data comprising a first data stream of accelerometer data and location data from a first gait sensor of the gait sensor pair, and a second data stream of accelerometer data and location data from a second gait sensor of the gait sensor pair; and inputting the real-time movement data as an additional set of predictive variables into the predicted odds machine learning model.

Example 28. The method of any of Examples 16-27, further comprising determining that the first gait sensor is greater than a predetermined threshold distance from the second gait sensor; and generating a warning message indicating an out of bounds range of the proximity of the first gait sensor and the second gait sensor being greater than the threshold distance.

Example 29. The method of any of Examples 16-28, further comprising: inputting the data streams of accelerometer data and location data into a predictive gait determination model to determine a real-time gait value of the participant.

Example 30. The method of any of Examples 16-29, further comprising: based on the real-time movement information of the particular participant, evaluating whether the gait of the particular participant is outside of an average or normal gait for a type of activity being performed by the particular participant.

Example 31. A non-transitory computer-readable medium storing instructions which, when executed by one or more processors of a system, cause the system to perform the method of any one of Examples 16-30.

Moreover, any of the disclosed embodiments may be embodied in various types of hardware, software, firmware, and combinations thereof. The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g., any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g., and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors;
a non-transitory computer-readable medium storing a plurality of instructions, which when executed, cause the one or more processors to:
obtain historical information for past events associated with one or more participants including predictive variables associated with the past events, and historical odds for outcomes of the past events;
train a predicted odds machine learning model, wherein the predicted odds machine learning model is a neural network, to determine predicted odds, comprising:
create, using the predictive variables as independent variable input and the historical odds as dependent variable input, the predicted odds machine learning model including:
training a set of linear regression models by implementing forward stepwise variable selection using the predictive variables; and
determining an average model of the set of linear regression models;

obtain current information for at least a first upcoming event associated with the one or more participants including a set of predictive variables associated with the first upcoming event; and determine predicted odds for the first upcoming event by inputting the set of predictive variables associated with the first upcoming event into the predicted odds machine learning model; and a plurality of gait sensors pairs, each gait sensor pair comprising: a water-proof housing, a unique identifier, an accelerometer, a processor, an onboard clock and a wireless communication subsystem, and wherein each sensor pair unique identifier is associated with a unique identifier of a particular participant of the one or more participants, and wherein the plurality of gait sensor pairs produce accelerometer data and location data for a particular participant, wherein a plurality of onboard clocks are synchronized to a same time;

wherein the one or more processors are configured to:
associate, a first participant identifier of a first participant to a first gait sensor identifier and a second gait sensor identifier;
associate, a second participant identifier of a second participant to a third gait sensor identifier and a fourth gait sensor identifier;
display, via a user interface, the first participant identifier being associated with the first gait sensor identifier and the second gait sensor identifier;
display, via the user interface, the second participant identifier being associated with the third gait sensor identifier and the fourth gait sensor identifier;
send an activation command to the first, second, third and fourth gait sensors, wherein the activation command includes pairing information of associated gait sensors;
receive real-time movement data comprising a first data stream of accelerometer data and location data from the first gait sensor, the second gait sensor, the third gait sensor and the fourth gait sensor, wherein the first gait sensor and the second gait sensor are attached to the first participant, and the second gait sensor and third gait sensor are attached to the second participant;
determine based on the real-time movement data whether the first gait sensor or the second gait sensor has been attached to a participant other than the first participant; and
input the real-time movement data as an additional set of predictive variables into the predicted odds machine learning model and determine current odds for the first upcoming event.

2. The system of claim 1, wherein the plurality of instructions, when executed, further cause the one or more processors to:
determine a set of past odds differences between predicted odds outputted by the predicted odds machine learning model for one or more of the past events and the historical odds for the one or more past events; and
create a risk manager machine learning model that determines a specialized risk value by training a linear regression model using the set of past odds differences as independent variable input and actual outcomes of the past events as dependent variable input.

3. The system of claim 2, wherein the plurality of instructions, when executed, further cause the one or more processors to:

determine a current odds difference between a plurality of determined predicted odds for the first upcoming event and current odds for the first upcoming event; and
determine the specialized risk value associated with the first upcoming event by inputting the current odds difference into the risk manager machine learning model.

4. The system of claim 3, wherein the plurality of instructions, when executed, further cause the one or more processors to:
initiate an automated wager for the first upcoming event based on the specialized risk value.

5. The system of claim 4, wherein the plurality of instructions, when executed, further cause the one or more processors to:
create, as part of the predictive variables, a derived set of predictive variables by applying one or more functions to the predictive variables, the functions including one or more of a z-score function, a low-pass filter, or a high-pass filter.

6. The system of claim 5, wherein creating the predicted odds machine learning model further includes:
adjusting, based on venues of the past events, the average model on a per-venue basis using a linear regression.

7. The system of claim 1, wherein the processors are further configured to:
determine that the first gait sensor is greater than a predetermined threshold distance from the second gait sensor; and
generate a warning message indicating an out of bounds range of a proximity of the first gait sensor and the second gait sensor being greater than a threshold distance.

8. The system of claim 7, wherein the processors are further configured to:
input the data streams of accelerometer data and location data into a predictive gait determination model to determine a real-time gait value of the participant.

9. The system of claim 8, wherein the processors are further configured to:
based on the real-time movement information of the particular participant, evaluate whether a gait of the particular participant is outside of an average or normal gait for a type of activity being performed by the particular participant.

10. A computer-implemented method comprising:
obtaining historical information for past events associated with one or more participants including predictive variables associated with the past events, and historical odds for outcomes of the past events;
training a predicted odds machine learning model, wherein the predicted odds machine learning model is a neural network, determine predicted odds, comprising:
creating, using the predictive variables as independent variable input and the historical odds as dependent variable input, the predicted odds machine learning model including:
training a set of linear regression models by implementing forward stepwise variable selection using the predictive variables; and
determining an average model of the set of linear regression models;
obtaining current information for at least a first upcoming event associated with the one or more participants including a set of predictive variables associated with the first upcoming event;

determining predicted odds for the first upcoming event by inputting the set of predictive variables associated with the first upcoming event into the predicted odds machine learning model;

providing a plurality of gait sensors pairs, each gait sensor pair comprising: a water-proof housing, a unique identifier, an accelerometer, a processor, an onboard clock and a wireless communication subsystem, and wherein each sensor pair unique identifier is associated with a unique identifier of a particular participant of the one or more participants, and wherein the plurality of gait sensor pairs produce accelerometer data and location data for a particular participant, wherein a plurality of onboard clocks are synchronized to a same time;

associating, a first participant identifier of a first participant to a first gait sensor identifier and a second gait sensor identifier;

associating, a second participant identifier of a second participant to a third gait sensor identifier and a fourth gait sensor identifier;

displaying, via a user interface, the first participant identifier being associated with the first gait sensor identifier and the second gait sensor identifier;

displaying, via the user interface, the second participant identifier being associated with the third gait sensor identifier and the fourth gait sensor identifier;

sending an activation command to the first, second, third and fourth gait sensors, wherein the activation command includes pairing information of associated gait sensors;

receiving real-time movement data comprising a first data stream of accelerometer data and location data from the first gait sensor, the second gait sensor, the third gait sensor and the fourth gait sensor, wherein the first gait sensor and the second gait sensor are attached to the first participant, and the second gait sensor and third gait sensor are attached to the second participant;

determining based on the real-time movement data whether the first gait sensor or the second gait sensor has been attached to a participant other than the first participant; and inputting the real-time movement data as an additional set of predictive variables into the predicted odds machine learning model and determining current odds for the first upcoming event.

11. The computer-implemented method of claim 10, further comprising:

determining a set of past odds differences between predicted odds outputted by the predicted odds machine learning model for one or more of the past events and the historical odds for the one or more past events; and creating a risk manager machine learning model that determines a specialized risk value by training a linear regression model using the set of past odds differences as independent variable input and actual outcomes of the past events as dependent variable input;

wherein the risk manager machine learning model is a trained neural network.

12. The computer-implemented method of claim 11, further comprising:

determining a current odds difference between a plurality of determined predicted odds for the first upcoming event and current odds for the first upcoming event; and determining the specialized risk value associated with the first upcoming event by inputting the current odds difference into the risk manager machine learning model.

13. The computer-implemented method of claim 12, further comprising:

initiating an automated wager for the first upcoming event based on the specialized risk value.

14. The computer-implemented method of claim 13, further comprising:

creating, as part of the predictive variables, a derived set of predictive variables by applying one or more functions to the predictive variables, the functions including one or more of a z-score function, a low-pass filter, or a high-pass filter.

15. The computer-implemented method of claim 14, wherein creating the predicted odds machine learning model further includes: adjusting, based on venues of the past events, the average model on a per-venue basis using a linear regression.

16. The computer-implemented method of claim 10, further comprising:

determining that the first gait sensor is greater than a predetermined threshold distance from the second gait sensor; and generating a warning message indicating an out of bounds range of a proximity of the first gait sensor and the second gait sensor being greater than a threshold distance.

17. The computer-implemented method of claim 16, wherein the processors are further configured to: inputting the data streams of accelerometer data and location data into a predictive gait determination model to determine a real-time gait value of the participant.

18. The computer-implemented method of claim 17, wherein the processors are further configured to: based on the real-time movement information of the particular participant, evaluating whether a gait of the particular participant is outside of an average or normal gait for a type of activity being performed by the particular participant.

* * * * *